United States Patent [19]

Lacourse et al.

[11] Patent Number: 5,035,930
[45] Date of Patent: Jul. 30, 1991

[54] BIODEGRADABLE SHAPED PRODUCTS AND THE METHOD OF PREPARATION THEREOF

[75] Inventors: Norman L. Lacourse; Paul A. Altieri, both of Plainsboro, N.J.

[73] Assignee: National Starch and Chemical Investment Holding Corporation, Wilmington, Del.

[21] Appl. No.: 477,374

[22] Filed: Feb. 9, 1990

Related U.S. Application Data

[63] Continuation of Ser. No. 353,352, May 17, 1989, abandoned, which is a continuation-in-part of Ser. No. 292,089, Dec. 30, 1988, Pat. No. 4,863,655.

[51] Int. Cl.$^5$ .......................... B29C 67/22; C08J 9/12
[52] U.S. Cl. .................................. 428/35.6; 106/122; 106/210; 106/213; 264/53; 264/186; 264/DIG. 5; 428/36.5; 521/79; 521/82; 521/84.1
[58] Field of Search ............................ 428/35.6, 36.5; 106/122, 210, 213; 521/79, 82, 84.1; 264/53, 186, DIG. 5

[56] References Cited

U.S. PATENT DOCUMENTS

| | | | |
|---|---|---|---|
| 2,788,546 | 4/1957 | Mellies et al. | 18/55 |
| 3,116,351 | 12/1963 | Wohlrabe et al. | 264/186 |
| 3,117,014 | 1/1964 | Klug | 106/213 |
| 3,137,592 | 6/1964 | Protzman et al. | 127/32 |
| 3,243,308 | 3/1966 | Barger et al. | 106/213 |
| 3,265,509 | 8/1966 | Wurzburg et al. | 99/134 |
| 3,265,510 | 8/1966 | Wurzburg et al. | 99/134 |
| 3,336,429 | 8/1967 | Carevic | 264/186 |
| 3,407,070 | 10/1968 | Murray et al. | 99/83 |
| 3,891,624 | 6/1975 | Boonstra et al. | 260/233.3 R |
| 3,954,104 | 5/1976 | Kraskin et al. | 128/263 |
| 3,962,155 | 6/1976 | Vsamoto et al. | 260/2.5 R |
| 4,026,986 | 5/1977 | Christen et al. | 264/301 |
| 4,076,846 | 2/1978 | Nakatsuka et al. | 426/62 |
| 4,125,495 | 11/1978 | Griffin | 260/17.4 ST |
| 4,156,759 | 5/1979 | Hostettler | 521/102 |
| 4,218,350 | 8/1980 | Griffin | 260/17.4 ST |
| 4,232,047 | 11/1980 | Sair et al. | 426/96 |
| 4,482,386 | 11/1984 | Wittwer et al. | 106/135 |
| 4,576,284 | 3/1986 | Wittwer et al. | 206/530 |
| 4,591,475 | 5/1986 | Tomka et al. | 264/328.14 |
| 4,655,840 | 4/1987 | Wittwer et al. | 106/126 |
| 4,673,438 | 6/1987 | Wittwer et al. | 106/126 |
| 4,738,724 | 4/1988 | Wittwer et al. | 106/213 |
| 4,738,817 | 4/1988 | Wittwer et al. | 264/328.14 |
| 4,790,881 | 12/1988 | Wittwer et al. | 106/189 |
| 4,900,361 | 2/1990 | Sachetto et al. | 106/213 |

FOREIGN PATENT DOCUMENTS

| | | |
|---|---|---|
| 282451 | 9/1988 | European Pat. Off. |
| 303460 | 2/1989 | European Pat. Off. |
| 304401 | 2/1989 | European Pat. Off. |
| 326517 | 8/1989 | European Pat. Off. |
| 327505 | 8/1989 | European Pat. Off. |
| 344118 | 11/1989 | European Pat. Off. |
| 366256 | 5/1990 | European Pat. Off. |
| 53-19645 | 6/1978 | Japan . |
| 02955 | 9/1983 | PCT Int'l Appl. |
| WO9005161 | 5/1990 | PCT Int'l Appl. |
| WO9010671 | 9/1990 | PCT Int'l Appl. |
| 965349 | 7/1964 | United Kingdom . |
| 2187703 | 9/1987 | United Kingdom . |
| 2190093 | 11/1987 | United Kingdom . |
| 2214919 | 9/1989 | United Kingdom . |
| 2214920 | 9/1989 | United Kingdom . |

OTHER PUBLICATIONS

Chinnaswamy, R. et al., Cereal Chemistry, "Relationship Between Amylose Content and Extrusion-Expansion Properties of Corn Starches", vol. 65, No. 2, 1988, pp. 138-143.

Chinnaswamy, R. et al., J. of Food Science, "Optimum Extrusion-Cooking Conditions for Maximum Expansion of Corn Starch", vol. 53, No. 3, 1988, pp. 834-840.

R. Charboniere et al., Cereal Science Today, "Changes in Various Starches by Cooking-Extrusion Processing II Physical Structure of Extruded Products" 18, No. 9, 1973 (Abstract No. 57).

R. Chinnaswamy et al., Starch/Starke, "Expansion Color and Shear Strength Properties of Corn Starches Extrusion-Cooked with Urea and Salts", 40 No. 5, 1988, pp. 186-190.

Extrusion of Foods, "Extrusion of Starches and Starchy Materials", CRC Press Inc., 1981, pp. 41-59.

C. Mercier, Die Starke, "Effect of Extrusion-Cooking on Potato Starch Using a Twin Screw French Extruder", 29(2), 1977, pp. 48-52.

C. Mercier, Food Process Engineering, "Structure and Digestibility Alterations of Cereal Starch by Twin-Screw Extrusion-Cooking", Vol. I, 1980, pp. 795-807.

C. Mercier et al., Cereal Chemistry, "Modification of Carbohydrate Components by Extrusion-Cooking of Cereal Products", 52(3), 1975, pp. 283-297.

C. Mercier et al., Cereal Chemistry, "Formation of Amylose-Lipid Complexes by Twin-Screw Extrusion Cooking of Manioc Starch", 57(1) 1980, pp. 4-9.

C. Mercier et al., Polysaccharides in Foods, "Structural Modification of Various Starches by Extrusion Cooking with a Twin-Screw French Extruder", 1979, pp. 153-170.

*Primary Examiner*—Morton Foelak
*Attorney, Agent, or Firm*—Eugene Zagarella, Jr.; Edwin M. Szala

[57] ABSTRACT

A biodegradable shaped product comprising an expanded high amylose starch product having at least 45% by weight amylose content, said expanded product having a low density, closed cell structure with good resilience and compressibility.

Another embodiment provides a biodegradable packaging material comprising an expanded, low density, closed cell starch product, the starch having at least 45% by weight amylose content and the expanded product having a bulk density of less than about 2.0 lb/ft$^3$, a resiliency of at least about 50%, and a compressibility of from about 100 to 800 g/cm$^2$.

31 Claims, No Drawings

BIODEGRADABLE SHAPED PRODUCTS AND THE METHOD OF PREPARATION THEREOF

This application is a continuation of application Ser. No. 353,352, filed May 17, 1989, now abandoned, which is a continuation-in-part of application Ser. NO. 292,089 filed Dec. 30, 1988, now U.S. Pat. No. 4,863,655.

BACKGROUND OF THE INVENTION

This invention relates to biodegradable shaped products including packaging products and packaging material derived from high amylose starch and to the method of preparation thereof.

Problems associated with the handling of environmental waste, particularly the large amount of discardable plastic products and the limited volume of land fill facilities, has placed added emphasis on developing products which are either biodegradable or recyclable. This is particularly true in the packaging areas where large volumes of discardable plastic packaging materials are used in various forms, including containers, sheets, films, tubing and fillers. Because of this large increase in the use of plastic materials, it has been proposed to make throwaway materials from biodegradable plastics to alleviate the waste disposal problems. Several reasons have prevented the development and likelihood of developing this technology except in special situations. First of all, the high volume packaging plastics such as polyethylene, polystyrene, polypropylene and polyethylene terephthalate are low cost and are not biodegradable. Attempts to make such materials biodegradable by blending them with biodegradable fillers or additives have not been overly successful. Those existing plastics which are biodegradable, are deficient in properties required in most packaging applications and are more expensive than commonly used packaging plastics. Degradable plastics are more difficult to recycle than nondegradable plastics. Furthermore, another reason the nondegradable plastics are preferred in landfill sites is because they do not generate noxious or toxic gases.

Starch, a readily available, known biodegradable material, has been used to prepare foamed and film products as well as other shaped products for different purposes including selected packaging applications. In Patent Cooperation Treaty (PCT) Publication No. WO 83/02955, a foamed starch product is formed by extruding starch in the presence of a gas expanding agent, the product being useful in various applications such as foam sheets or fillers for packing.

The use of starch materials to form film products is well known, as shown e.g., in British Patent No. 3,116,351 which discloses the extrusion of amylose material without using solvents, to form films having excellent tensile strength. Another film forming operation using starch is shown in U.S. Pat. No. 3,116,351 where an unsupported amylose film is made by extruding an aqueous alkali-amylose solution into a coagulation mixture of ammonium sulfate and sodium sulfate.

U.S. Pat. No. 4,156,759 discloses a process for preparing low cost polyurethane foam by incorporating a starch containing amylaceous material into the foamed material yielding rigid or flexible and high resilient products.

U.S. Pat. No. 3,137,592 shows the extrusion of starch to produce an expanded gelatinized product in different shapes and forms, such as ribbon, ropes and tubes, which are useful in a variety of applications.

U.S. Pat. No. 3,336,429 involves a method for producing clear, thin, elongated shaped structures of amylose in forms such as film, tubes, bands and filament, by extruding an aqueous caustic solution of high amylose material through an aqueous acid bath.

U.S. Pat. No. 3,891,624 discloses the preparation of dispersible, hydrophobic porous starch product by extrusion of a selected hydrophobic starch material at a temperature of 100° to 250° C. and a moisture content of 4 to 15 percent.

The use of starch in foods and confectionery products is well know. One area where starch use has been of particular interest involves expanded products such as snack foods and dry pet foods. The quality of such products, as evidenced by their crispiness, is affected by expansion volume which was studied and reviewed in two recent articles by R. Chinnaswamy and M. A. Hanna: "Relationship Between Amylose Content and Extrusion-Expansion Properties of Corn Starch", *Cereal Chemistry*, Vol. 65, No. 2, 1988, pp. 138 to 143 and "Optimum Extrusion-Cooking Conditions for Maximum Expansion of Corn Starch", *Journal of Food Science*, Vol. 53, No. 3, 1988, pp. 834 to 840.

The use of starch in the manufacture of confectionery products is disclosed in U.S. Pat. No. 3,265,509 where a mixture of high amylose starch and sugar is passed through an extruder in the presence of less than 25% moisture, to form a solid, plastic, shape-retaining confectionery mass.

U.S. Pat. No. 3,962,155 discloses a molded foam product of different forms obtained by blending pullulan, a polysaccharide produced by Pullularis pullulans, or modified pullulan with a gas yielding foaming agent.

While many of the disclosures noted above show the use of amylose containing starch materials in forming films and various other shaped products, the use of such materials in packaging has generally been limited to selected applications such as film wrappings for food. The area involving resilient, compressible, low density packaging materials for uses such as protective packaging, has been generally left to lightweight plastics, including expanded polystrene, more particularly Styrofoam (registered trademark of Dow Chemical Co.). However, as noted earlier, these materials are not biodegradable and, therefore, the need still exists for a material which will meet the demanding requirements of the packaging industry while satisfying the ever increasing governmental regulations and controls for environmental waste.

SUMMARY OF THE INVENTION

The present invention provides a biodegradable shaped product comprising an expanded high amylose starch product having a low density, closed cell structure with good resilience and compressibility properties. More particularly, the expanded starch product of this invention, which includes packaging products and packaging material, has at least 45% by weight amylose content, a bulk density of 0.1 to 5 lb/ft$^3$, a resiliency of at least about 20% and a compressibility of from about 100 to 800 g/cm$^2$.

In one embodiment of this invention, the biodegradable product is a packaging material, such as an insert or loose fill, having a uniform closed cell structure with a bulk density of less than about 2.0 lb/ft$^3$, a resiliency of at least about 50% and a compressibility of from about 100 to 800 g/cm$^2$.

Another embodiment of this invention relates to a method of preparing low density, biodegradable shaped products such as packaging products and packaging material comprising extruding an amylose starch having at least 45% amylose content, in the presence of a total moisture content of 21% or less by weight, at a temperature of about 150° to 250° C.

DETAILED DESCRIPTION OF THE INVENTION

The ability to provide a shaped product for packaging applications which is biodegradable, is an important feature of this invention. The term "biodegradable" as used herein refers to the susceptibility of a substance to decomposition by living things (organisms/microorganisms) and/or natural environmental factors, e.g., the ability of compounds to be chemically broken down by bacteria, fungi, molds and yeast. Plastics used in packaging, especially polystyrene are not biodegradable. This creates a problem in the area of low density packaging, where expanded polystrene such as Styrofoam is used in large volumes in many applications, particularly protective packaging or loose fill. While starch is a material with known biodegradable properties, its use in packaging has not been widespread primarily because it lacked many of the physical attributes required of packaging materials.

Now, in accordance with this invention, a biodegradable, low density, low cost shaped product is obtained by expanding a high amylose starch material, having at least 45% by weight of amylose content, through an extruder in the presence of a total moisture content of 21% or less by weight, at a temperature of from about 150° to 250° C. Depending on the particular end use application, the expanded product can be used in the form it is in after extrusion, e.g., a sheet, cylindrical or rope-like product or it can be further formed and configured into different shapes, such as a carton, container or tray. In one embodiment, the expanded, high amylose starch material exits the extruder in the form of a sheet or cylindrical rope, has excellent resilience and compressibility properties, which coupled with its low density, make it attractive for use as a packaging material, particularly in the area of protective packaging. Therefore, the expanded biodegradable starch product can be provided in various forms and shapes making it useful as a packaging product such as containers, cartons, trays, cups, dishes, sheets, etc., or as packaging material for uses such as loose fill or a filler, insulator, sheet or as protective packaging, e.g., cushioning for sensitive equipment, apparatus and components.

The starting starch material useful in this invention must be a high amylose starch, i.e., one containing at least 45% by weight of amylose. It is well known that starch is composed of two fractions, the molecular arrangement of one being linear and the other being branched. The linear fraction of starch is known as amylose and the branched fraction amylopectin. Starches from different sources, e.g., potato, corn, tapioca, and rice, etc., are characterized by different relative proportions of the amylose and amylopectin components. Some plant species have been genetically developed which are characterized by a large preponderance of one fraction over the other. For instance, certain varieties of corn which normally contain about 22–28% amylose have been developed which yield starch composed of over 45% amylose. These hybrid varieties have been referred to as high amylose or amylomaize.

High amylose corn hybrids were developed in order to naturally provide starches of high amylose content and have been available commercially since about 1963. Suitable high amylose starches useful herein are any starches with an amylose content of at lest 45% and preferably at least 65% by weight. While high amylose corn starch has been especially suitable, other starches which are useful include those derived from any plant species which produces or can be made to produce a high amylose content starch, e.g., corn, peas, barley and rice. Additionally, high amylose starch can be obtained by separation or isolation such as the fractionation of a native starch material or by blending isolated amylose with a native starch.

The high amylose starch used in this invention may be unmodified or modified and the term starch as used herein includes both types. By modified it is meant that the starch can be derivatized or modified by typical processes known in the art, e.g., esterification, etherification, oxidation, acid hydrolysis, cross-linking and enzyme conversion. Typically, modified starches include esters, such as the acetate and the half-esters of dicarboxylic acids, particularly the alkenylsuccinic acids; ethers, such as the hydroxyethyl- and hydroxypropyl starches and starches reacted with hydrophobic cationic epoxides; starches oxidized with hypochlorite; starches reacted with cross-linking agents such as phosphorus oxychloride, epichlorohydrin, and phosphate derivatives prepared by reaction with sodium or potassium orthophospate or tripolyphosphate and combinations thereof. These and other conventional modifications of starch are described in publications such as "Starch: Chemistry and Technology", Second Edition, edited by Roy L. Whistler et al., Chapter X; Starch Derivatives: Production and Uses by M. W. Rutenberg et al., Academic Press, Inc., 1984.

One modification of the high amylose starches used in this invention that is especially advantageous, is the etherification with alkylene oxides, particularly those containing 2 to 6, preferably 2 to 4, carbon atoms. Ethylene oxide, propylene oxide and butylene oxide are exemplary compounds useful in etherifying the starting starch materials with propylene oxide being especially preferred. Varying amounts of such compounds may be used depending on the desired properties and economics. Generally, up to 15% or more and preferably, up to about 10%, by weight, based on the weight of starch will be used. Extruded starches modified in this manner, showed improved expansion, uniformity and resiliency.

Additive compounds may also be combined or blended with the starch starting material to improve properties such as strength, flexibility, water resistance, resiliency, flame retardancy, density, color, etc. as well as to provide repellency to insects and rodents, if needed or desired. Compounds such as polyvinyl alcohol, monoglycerides, and poly(ethylene vinyl acetate) are typical additives which may be used. Regarding flame retardants, there are many known compounds and classes of compounds which may be used including phosphorus containing compounds such as sodium phosphate, sodium triphosphate and ammonium phosphate, as well as sulfur containing compounds such as ammonium sulfate and ammonium sulfamate. Water resistance can also be improved using additives with styrene acrylate resins being one type that was found particularly effective. Density as well as resiliency and flexibility can be improved by incorporation of synthetics such as polyvinyl alcohol, polyvinyl acetate, polyurethane, polystyrene, poly)ethylene vinyl acetate) and polyvinylpyrrolidone. These additives may be sued in any amount that will effectively satisfy the desired property, provided the extrusion of the starch and the overall properties of the expanded product are suitable. Typically, up to about 50% by weight of such additives, and preferably up to about 10% by weight, may be used.

In addition to the above noted modified starches and additive compounds, a pregelatinized form of the starch starting material may be used, if desired.

In preparing the shaped products of this invention, an extrusion process, either alone or in combination with other forming operations, may be used depending on the type of final product desired. The expanded starch product leaving the extruder is typically in a rope or cylindrical form. By varying the size and configuration of the die opening of the extruder, different forms such as sheets of varying thickness and widths, irregular profiles and other shapes may be obtained. Products of this type may have particular application as packaging materials such as inserts and loose fill or fillers and as protective packaging for electrical and other sensitive equipment. When expanded products of different shapes and design are desired, other forming operations subsequent to the extrusion operation may be utilized. One such readily adaptable technique involves thermoforming. In this operation, a material is heated to a temperature at which it is pliable or shapable and then forced against a mold by applying vacuum, air or mechanical pressure. After the expanded starch product of this invention leaves the extruder, it is still quite hot and malleable and therefore well suited for the thermoforming step. Shaped products such as containers, cartons, trays, dishes, cups, etc., can be formed by thermoforming an extruded starch sheet. Additionally, products of increased density and thickness can be obtained by pressing together layers of one or more extruded sheets.

Other methods of forming the expanded starch products may also be used in addition to the extrusion/thermoforming operations discussed above. Such methods include injection molding, blow molding, extrusion-blow molding and stamping, as well as combinations of these and other methods.

One method used in preparing the shaped products of this invention is an extrusion process wherein the starting high amylose starch is fed into an extruder and conveyed through the apparatus under select conditions. The product emerging from the extruder is an expanded, closed cell, low density material with good resilience and compression properties making it particularly suitable for packaging applications such as protective packaging. Extrusion is a conventional well know technique used in many applications for processing plastics and has been used to a lesser or limited extent in processing food starches as noted in some of the disclosures cited earlier which show extrusion of starch materials to produce products such as films, foods and confectioneries and gelatinized starches.

An important feature of this invention is the ability to produce an expanded, biodegradable starch product having a uniform, closed cell structure with low density and good resilience and compressibility properties. This is accomplished by the extrusion of a high amylose starch, i.e., starch having at least 45% and preferably at least 65% by weight amylose content, at a total moisture or water content of 21% or less by weight and at a temperature of from about 150° to 250° C.

The important property characteristics of the extruded product of this invention are its relatively light weight, as evidenced by bulk density, as well as its resilience and compressibility. The uniform, closed cell structure of the product with its characteristic tiny bubble formation, not only results in a Styrofoam-like appearance and density, but gives it the necessary resilience and compressibility needed for different packaging applications. A closed cell structure is defined as one having largely nonconnecting cells, as opposed to open cells which are largely interconnecting or defined as two or more cells interconnected by broken, punctured or missing cell walls. The tiny bubble formation generally results in a small cell size of typically about 100 to 600 microns.

The bulk density, resilience and compressibility properties of the product are measured in accordance with procedures described hereinafter.

The bulk density of the product will be from about 0.1 to 5 $lb/ft^3$, and preferably from about 0.2 to 3.0 $lb/ft^3$; the resilience is at least about 20%, preferably at least about 50% and the compressibility will range from about 100 to 800, preferably about 150 to 700 and more preferably from about 400 to 600 $g/cm^2$. In an embodiment where the product is a packaging material useful as protective packaging, the bulk density of the product will be less than about 2.0 $lb/ft^3$, preferably less than about 1.0 and more preferably less than about 0.6 $lb/ft^3$; the resilience is at least about 50% and preferably at least about 60%.

In order to obtain the expanded, closed cell structure characteristic of the desired product, it is important that the total moisture content of the high amylose starch material feed be at a level of 21% or less by weight, based on the dry weight of starch material. By total moisture or water content is meant both the residual moisture of the starch, that is the amount picked up while stored at ambient conditions, and the amount of water fed to the extruder. Typically, starch, and particularly high amylose starch, will contain about 9 to 12% residual moisture. Enough water must be present to allow the material to be processed, mixed and heated to the desired temperatures. While some water may be added to the extruder, only an amount which will bring the total moisture level to 21% or less can be added. This is necessary to allow for the desired expansion and cell structure formation in the prepared product. Accordingly, while the total moisture content that is used for carrying out the process may very somewhat, depending on the actual material used and other process variations, a range of from about 10 to 21%, preferably from about 13 to 19% and more preferably from about 14 to 17% by weight, will generally be suitable. The temperature of the material in the extruder will be increased to reach about 150° to 250° C. This temperature must be maintained in at least the section of the extruder closest to the die and just before the material leaves the extruder. The die is positioned at the point or location at the end of the extruder from which the extruded material emerges or exits the apparatus into the ambient air. Depending on the particular material being processed, as well as other process variations, this temperature can vary somewhat within the noted range and preferably will be from about 160° to 210° C. When modified starch such as the etherified material is used, the temperature used will preferably be from 160° to 180° C. while the use of unmodified starch will have a preferred temperature of from about 170° to 210° C. in at least the section of the extruder closest to the die. By maintaining these conditions in the extruder, the material upon leaving the die and extruder outlet into the open air, expands and cools to form an expanded, low density, resilient and compressible starch product.

The apparatus used in carrying out this process may be any screw-type extruder. While the use of a single- or twin-screw extruder may be used, it is preferred to use a twin-screw extruder. Such extruders will typically have rotating screws in a horizontal cylindrical barrel with an entry port mounted over one end and a shaping die mounted at the discharge end. When twin screws are used, they may be corotating and intermeshing or nonintermeshing. Each screw will comprise a helical flight or threaded section and typically will have a relatively deep feed section followed by a tapered transition section and a comparatively shallow constant-depth meter section. The screws, which are motor driven, generally fit snuggly into the cylinder or barrel to allow mixing, heating and shearing of the material as it passes through the extruder.

Control of the temperature along the length of the extruder barrel is important and is controlled in zones along the length of the screw. Heat exchange means, typically a passage, such as a channel, chamber or bore located in the barrel wall, for circulating a heated media such as oil, or an electrical heater such as calrod or coil type heaters, is often used. Additionally, heat exchange means may also be placed in or along the shaft of the screw device.

Variations in any of the elements used in the extruder may be made as desired in accordance with conventional design practices in the field. A further description of extrusion and typical design variations can be found in "Encyclopedia of Polymer Science and Engineering", Vol. 6, 1986, pp. 571 to 631.

Thermoforming as well as other forming operations which may be used in making the shaped product of this invention are well known in the art. In carrying out a thermoforming operation, typically the equipment would include a heater (if necessary) or means to maintain/control adjust the temperature of the sheet or article being worked on, a mold, pressure producing means i.e., air, vacuum or mechanical as well as auxillary means to hold and transfer the article, and optional means such as cutting, trimming, etc. A description of illustrative thermoforming operations and equipment used therein may be found in "Encyclopedia of Polymer Science and Engineering", Vol. 13, 1976, pp. 832 to 843. This and other well known forming operations which may be used are further described in the "Encyclopedia of Chemical Technology", Vol. 18, 1982, pp. 184 to 206.

The expanded product resulting from the extrusion of the high amylose starch has excellent properties for packaging, particularly in the areas of protective packaging. The finished product has properties making it comparable in most aspects to Styrofoam, or expanded polystyrene with the added feature that it is biodegradable.

An additional and important feature of the product of this invention is that is does not retain an electrostatic charge buildup as commonly found in plastics. This static-free characteristic, makes the material especially attractive for the protective packaging of sensitive electrical apparatus or devices, unlike the traditional commercially available Styrofoam material which requires a special or different grade product for this purpose.

In the following examples which are merely illustrative of the various embodiments of this invention, all parts and percentages are give by weight and all temperatures are in degrees Celsius unless otherwise noted.

The following procedures were used to determined the characteristic properties of material being evaluated and as specified throughout the specification and claims:

Bulk Density

The method used to determine the bulk density of the material was the volume replacement method described by M. Hwang and K. Hayakawa in "Bulk Densities of Cookies Undergoing Commercial Baking Processes", *Journal of Food Science,* Vol. 45, 1980, pp. 1400–1407. Essentially, this involved taking a beaker of known volume, i.e., 500 ml. and determining the wight of small glass beads (diameter 0.15–0.16 mm) needed to fill the beaker. This allowed the density of the glass beads to be established (formula below). The weight of a sample was measured and by measuring the weight of glass beads that were needed to replace the volume of that sample, the density of the sample was calculated using the following equations:

$$d_s = \frac{W_s}{W_{gr}} \cdot d_g$$

$$d_g = \frac{W_{gb}}{V_b}$$

where
$d_s$ = density of sample
$w_s$ = weight of sample
$w_{gr}$ = weight of glass beads need to replace volume of sample
$d_g$ = density of glass beads
$w_{gb}$ = weight of glass beads needed to fill beaker
$v_b$ = volume of beaker

Resiliency

The resiliency (also called rebound resilience or relaxation) refers to the ability of a material to recover to its original shape after it has been deformed by a force and was determined using a Stevens LFRA Texture Analyzer employing a cylindrical probe (TA-6, 0.25" diameter) run at a probe speed of 0.5 mm/sec. and a probe distance of 0.1 mm.

Sample extrudates were cut into 1-inch long pieces, placed on the texture analyzer's sample table, and secured with pins. The probe was lowered automatically using the above conditions. After the probe was fully lowered, it was held at that distance for one minute before it was released. The force required to initially compress the sample and the force required to compress the sample after one minute were determined. The percent recovery of the sample is determined by dividing the compression force after one minute by the initial compression force and multiplying by 100. A higher percent recovery corresponds to a material having a better resiliency.

Compressibility

The compressibility, i.e., the force necessary to deform a material, of a sample was determined using a Stevens LFRA Texture Analyzer employing the conditions as noted above in measuring resiliency.

Sample extrudates cut into 1-inch long pieces were placed on the analyzer's sample table and secured with pins. The probe was lowered and raised automatically with the force required to compress the sample being measured in g/cm$^2$. This analysis was repeated two additional times using a fresh piece of sample extrudate each time. The average of the three measurements was taken as the compressibility value. A high value is attributed to a sample that is relatively hard, i.e., less compressible, while a lower value is attributed to a sample that is easily compressible.

EXAMPLE I

Several samples of unmodified starch materials containing varying amounts of amylose content, i.e., corn (~25-28% amylose), waxy maize corn (~0-1% amylose), potato (~23% amylose), Hylon V (~50% amylose) and Hylon VII (~70% amylose) were fed to a Werner and Pfleiderer twin screw corotating extruder, model ZSK30. Hylon is a registered trademark of National Starch and Chemical Corporation for starches. The extruder had a screw having a high shear screw design, a barrel diameter of 30 mm, two die openings of 4 mm diameter each, a L/D of 21:1, and oil heated barrels. The samples were fed to the extruder which had a screw speed of 250 rpm, at a rate of 10 kg/hr with input moisture of about 6.7% based on weight of starch added (residual moisture of starting starch materials was 9 to 12%). The temperature in the extruder was increased to a level of about 200° C. in the barrel or section nearest or just before the die and the extruder pressure was between about 200 to 500 psi.

The expanded products leaving the extruder were collected and evaluated for different characteristics as shown in Table 1. The high amylose starches, i.e., Hylon V and VII had an essentially uniform, closed cell structure with tiny bubble formation quite evident. The base starches which contained significantly lower than 45% amylose content, i.e., corn starch, waxy maize starch and potato starch, all gave an expanded product but each had a poor, relatively open cell structure, and were brittle and easily crushed as typified by the results for corn starch shown in Table 1.

TABLE 1

| Sample Material | Bulk Density (lb/ft$^3$) | Resilience (%) | Compressibility (g/cm$^2$) |
|---|---|---|---|
| Corn Starch | 0.328 | 0 (no recovery crushed) | 1000 |
| Hylon V | 0.461 | — | 192 |
| Hylon VII | 0.105 | 68.3 | 128 |
| Styrofoam | 0.10 | 73.8 | 588 |

EXAMPLE II

Additional samples of corn starch and the high amylose starches, Hylon V and Hylon VII each modified by hydroxypropylating with propylene oxide (P.O.) were used to prepare expanded products using the same procedure as Example I with a temperature of about 175° C. in the barrel or section just before the die.

The expanded products leaving the extruder were collected and evaluated for different characteristics as shown in Table 2. The modified corn starch material expanded into a product which appeared better than the product made from corn starch alone, shown in Example I, but had an open cell structure, was brittle and crushed easily and disintegrated when compressed. The modified high amylose starches, i.e., Hylon V and VII had the desired uniform, closed cell structure which compared favorably with the products previously made form the unmodified starch and showed satisfactory bulk density, resilience and compressibility properties as well as increased strength and expansion diameter. Other expanded products were prepared from the same high amylose starches modified with amounts of from 2 to 10% of propylene oxide by weight and these products also exhibited satisfactory property characteristics and a uniform, closed cell structure.

TABLE 2

| Sample Material | Bulk Density (lb/ft$^3$) | Resilience (%) | Compressibility (g/cm$^2$) |
|---|---|---|---|
| Hylon V, 5% P.O. | 0.488 | 66.4 | 703 |
| Hylon VII, 5% P.O. | 0.321 | 73.2 | 508 |
| Styrofoam | 0.1 | 73.8 | 588 |

EXAMPLE III

Expanded products were prepared as in Example II using the high amylose Hylon VII (70% amylose) starch modified with propylene oxide (5%) with the addition of polyvinyl alcohol (2-40% by weight). Good expanded products were made as illustrated by the product containing 8% polyvinyl alcohol which had a bulk density of 0.351 lb/ft$^3$, a resilience of 70.0% and compressibility of 421 g/cm$^2$. All products gave improved strength and flexibility.

EXAMPLE IV

Additional products were prepared using the Hylon VII (70% amylose) starch with different modifiers, i.e., acetic anhydride, octenyl succinic anhydride, phosphorus oxychloride and diethyl aminoethyl chloride, and additives, i.e., monoglyceride and urea. Expanded products were made having some improved properties over the product derived from the unmodified starch while exhibiting a similar relatively uniform, closed cell structure.

EXAMPLE V

The effect of total moisture or water content on the extruded product was demonstrated by preparing a product using conditions as in Example II. The starting material was a high amylose, Hylon VII (70% amylose) starch containing a known amount of residual moisture. The level of total moisture was varied by adding different amounts of water to the extruder.

The resulting products were collected and evaluated for different characteristics as shown in Table 3. All the products gave a uniform closed cell structure except the one having total moisture at 12.8% was non-uniform and not evaluated for resilience and compressibility and those having 24.0 and 26.4% total moisture were nonexpanded rope-like products having unsuitable properties.

TABLE 3

| Starting Material | Initial Moisture Content (%) | Input Moisture (%) | Total Moisture (%) | Bulk Density (lb/ft³) | Resilience (%) | Compressibility (g/cm²) |
|---|---|---|---|---|---|---|
| Hylon VII, 5% P.O. | 8.0 | 4.8 | 12.8 | 0.22 | Not Uniform | |
| " | 8.0 | 5.5 | 13.5 | 0.26 | 62.15 | 791 |
| " | 8.0 | 6.1 | 14.1 | 0.24 | 62.77 | 264 |
| " | 8.0 | 6.7 | 14.7 | 0.31 | 62.34 | 473 |
| " | 8.0 | 7.4 | 15.4 | 0.27 | 70.74 | 542 |
| " | 8.0 | 8.0 | 16.0 | 0.29 | 70.68 | 493 |
| " | 8.0 | 8.6 | 16.6 | 0.39 | 72.34 | 519 |
| " | 8.0 | 9.2 | 17.2 | 0.36 | 62.74 | 669 |
| " | 8.0 | 9.8 | 17.8 | 0.36 | 62.39 | 668 |
| " | 8.0 | 10.4 | 18.4 | 0.45 | 62.15 | 723 |
| " | 8.0 | 10.9 | 18.9 | 0.53 | 64.35 | 521 |
| " | 8.0 | 11.5 | 19.5 | 0.47 | 63.66 | 632 |
| " | 8.0 | 12.1 | 20.1 | 0.42 | 61.95 | 543 |
| " | 8.0 | 12.6 | 20.6 | 0.38 | 63.42 | 609 |
| " | 20.4 | — | 20.4 | — | — | — |
| " | 20.4 | 3.6 | 24.0 | | Non-Expanded Product | |
| " | 20.4 | 6.0 | 26.4 | | Non-Expanded Product | |

EXAMPLE VI

Samples of starch materials similar to those prepared above were treated with styrene acrylate resins to improve the water resistance properties of the formel products. Samples of the propylene oxide (5%) modified high amylose starch (Hylon VII) were prepared as in Example II and further treated by adding different styrene acrylate resin compositions (described below). The liquid resins were pumped into the extruder subsequent to the starch feed and otherwise using the extrusion equipment and conditions described above in Example II, expanded products were prepared.

The styrene acrylate resins (viscosity 20–190 cps) were added to the extruder in an amount of about 3.9% by weight based on the amount of starch feed and had the following formulations:

Resin A had 44 parts of butyl acrylate, 30 parts of styrene, 13 parts of methyl methacrylate and 8.4 parts of methacrylic acid; Resin B had 29 parts of butyl acrylate, 20.5 parts of methyl methacrylate, 45.5 parts of styrene an 8.4 parts of methacrylic acid; and Resin C had 19 parts of butyl acrylate, 25.5 parts of methyl methacrylate, 50.5 parts of styrene and 8.9 parts of methacrylic acid.

One inch extrudate samples were placed in glass beakers containing 100 ml of water and the time taken for the material to become soggy and fall apart was observed to determine water resistance properties. All three samples which showed time of 1, 2.2 and 4.5 minutes respectively, had increased water resistance properties over the starch product without additive.

Additional samples of propylene oxide (5%) modified high amylose starch (Hylon VII) with the addition of polyvinyl alcohol (8%) as in Example III and the further addition of the styrene acrylate resins, as described above, were also prepared and evaluated. All three samples (A, B and C) showed times of 5.30, 15–16 and 35 minutes respectively, indicating increased water resistance properties.

EXAMPLE VII

Several samples of starch materials similar to those prepared above in Examples II and III, i.e., propylene oxide (5%) modified high amylose starch (Hylon VII) or propylene oxide (5%) plus polyvinyl alcohol (8%) modified high amylose starch (Hylon VII) were blended with selected phosphorus and sulfur containing additives to determine the flame retarding effects. The additives used were sodium phosphate, sodium tripolyphosphate, ammonium phosphate, ammonium sulfate and ammonium sulfamate.

The respective additive solutions were pumped into the extruder and using the equipment and conditions described in Example II, expanded products were prepared. Two inch pieces of the extrudate products were ignited with a match in a windless, no draft area and observed to determine if the flame was maintained or went out (extinguished) without using an extinguishing medium. All of the sample products were self-extinguishing, indicating they had improved flame retardant properties.

EXAMPLE VIII

Low density, malleable, expanded starch sheets were prepared using the same conditions as in Example I with the only modification being the substitution of a 1 mm thick slit die for the cylindrical die. The starch feed material was a high amylose starch (Hylon VII) modified by hydroxypropylating with propylene oxide (5%) as in Example II. A flat sheet product of approximately 3 mm thickness and 7.62 cm wide was obtained. As the hot sheet exited the extruder, it was immediately rolled or bent into various shapes such as cylinders, right angles, etc. After several minutes during which the material ambiently cooled, the shape was retained. The shaped, low density starch sheet possesses excellent compressibility and resiliency properties in its final form.

EXAMPLE IX

The flat, low density starch sheet produced in Example VIII is extremely malleable as it exits the extruder slit die. The hot sheet can readily be fed into a thermoforming device and molded into a shaped product using vacuum, air pressure or mechanical means and the appropriately shaped molds. The molded starch product readily exits the mold and retains its shape upon cooling. The shaped product possesses excellent low density, compressibility and resiliency properties. Typically the starch sheet is molded into such useful item as: food containers, egg cartons, trays, plates and cups.

What is claimed:

1. A biodegradable shaped product comprising an expanded, low density, closed cell, resilient and compressible starch product, said starch having at least 45% by weight amylose content and the expanded product having a bulk density of from about 0.1 to 5 lb/ft³, a resiliency of at least about 20%, and a compressibility of from about 100 to 800 g/cm$^2$.

2. The product of claim 1 wherein the starch has at least 65% by weight amylose content.

3. The product of claim 1 wherein the starch is modified with up to about 15% by weight of alkylene oxide containing 2 to 6 carbon atoms.

4. The product of claim 1 wherein the starch is modified with up to about 10% by weight of propylene oxide.

5. The product of claim 2 wherein the starch is modified with up to about 15% by weight of alkylene oxide containing 2 to 6 carbon atoms.

6. The product of claim 5 wherein the expanded product has a bulk density of from about 0.2 to 3 lb/ft$^3$.

7. The product of claim 6 wherein the expanded product has a resiliency of at least about 50% and a compressibility of from about 150 to 700 g/cm$^2$.

8. The product of claim 2 wherein the starch is modified with up to about 10% by weight of propylene oxide.

9. The product of claim 8 wherein up to about 10% by weight of polyvinyl alcohol is added to the starch.

10. The product of claim 8 wherein an effective amount of a flame retardant material is added to the starch.

11. The product of claim 8 wherein an effective amount of a water resistance additive is added to the starch.

12. The product of claim 11 wherein said additive is a styrene-acrylate resin.

13. The shaped product of claim 1 which is a packaging product in the form of a sheet.

14. The shaped product of claim 8 which is a packaging product in the form of a sheet.

15. A biodegradable packaging material comprising an expanded, low density, closed cell, resilient and compressible starch product, said starch having at least 45% by weight amylose content and the expanded product having a bulk density of less than about 2.0 lb/ft$^3$, a resiliency of at lest about 50%, and a compressibility of from about 100 to 800 g/cm$^2$.

16. The packaging material of claim 15 wherein the starch has at least 65% by weight amylose content.

17. The packaging material of claim 16 wherein the expanded product has a bulk density of less than about 1.0 lb/ft$^3$, a resiliency of at least about 60% and a compressibility of from about 150 to 700 g/cm$^2$.

18. The packaging material of claim 15 wherein the starch is modified with up to about 15% by weight of alkylene oxide containing 2 to 6 carbon atoms.

19. The packaging material of claim 15 wherein the starch is modified with up about 10% by weight of propylene oxide.

20. The packaging material of claim 15 wherein the starch is modified with up to about 15% by weight of alkylene oxide containing 2 to 6 carbon atoms.

21. The packaging material of claim 20 wherein the expanded product has a bulk density of less than about 1.0 lb/ft$^3$, a resiliency of at least about 60% and a compressibility of from about 150 to 700 g/cm$^2$.

22. The packaging material of claim 21 wherein the starch is modified with up to about 10% by weight of propylene oxide.

23. The packaging material of claim 22 wherein up to about 10% by weight of polyvinyl alcohol is added to the starch.

24. The packaging material of claim 23 wherein the expanded product has a bulk density of less than about 0.6 lb/ft$^3$.

25. The packaging material of claim 21 wherein an effective amount of a flame retardant material is added to the starch.

26. The packaging material of claim 16 wherein an effective amount of a water resistance additive is added to the starch.

27. The packaging material of claim 26 wherein said additive is a styrene-acrylate resin.

28. The shaped product of claim 1 prepared by extruding the starch in the presence of a total moisture content of 21% or less by weight and at a temperature of from about 150° to 250° C. followed by a thermoforming operation.

29. The product of claim 28 which is thermoformed into a packaging product selected from the group consisting of a container, carton, sheet, tray, dish or cup.

30. The product of claim 28 wherein the starch has at least 65% by weight amylose and is modified with up to about 15% by weight of alkylene oxide containing 2 to 6 carbon atoms.

31. The product of claim 30 which is thermoformed into a packaging product selected from the group consisting of a container, carbon, sheet, tray, dish or cup.

* * * * *